United States Patent [19]

Del Rosario

[11] Patent Number: 5,156,640

[45] Date of Patent: Oct. 20, 1992

[54] BIRD CAGE WITH CONVEYOR FOR DISPOSING OF DEBRIS

[76] Inventor: Luis Del Rosario, 4524 Brazil St., Los Angeles, Calif. 90039

[21] Appl. No.: 761,338

[22] Filed: Sep. 17, 1991

[51] Int. Cl.[5] .................. A01K 31/06; A01K 1/01
[52] U.S. Cl. ................................. 119/17; 119/164
[58] Field of Search .................... 119/17, 19, 164

[56] References Cited

U.S. PATENT DOCUMENTS

| 1,815,467 | 7/1931 | Craig | 119/17 |
| 2,186,120 | 1/1940 | Oser | 119/17 |
| 2,738,763 | 3/1956 | Bowes | 119/17 |
| 2,938,496 | 5/1960 | Wilkerson | 119/17 |
| 2,983,251 | 5/1961 | Lingis | 119/17 |
| 3,672,332 | 6/1972 | MacLeod et al. | 119/17 |
| 4,011,837 | 3/1977 | Ksioszk | 119/164 |
| 4,838,204 | 6/1989 | Young | 119/17 |

FOREIGN PATENT DOCUMENTS

| 3534522 | 4/1986 | Fed. Rep. of Germany | 119/164 |
| 83/00980 | 8/1983 | PCT Int'l Appl. | 119/164 |
| 83/02543 | 8/1983 | PCT Int'l Appl. | 119/17 |
| 2121371 | 12/1983 | United Kingdom | 119/17 |

Primary Examiner—Gene Mancene
Assistant Examiner—Todd E. Manahan
Attorney, Agent, or Firm—Wagner & Middlebrook

[57] ABSTRACT

A self-cleaning bird cage includes a chamber formed of a plurality of transparent vertical walls and a top enclosing a perch, with a perforated floor for permitting waste from birds to drop through. A cabinet supporting the chamber includes a platform under the floor with rollers at each end and including a roll of thin plastic material which tends to adhere to itself and to other materials which is fed as a web over the rollers to a take-up roll. Waste and debris falling through the perforated floor land on the web. The take-up roll is preferably driven by an electric motor which is operated for a period sufficient to transfer the soiled plastic material onto the take-up roll. A box positioned below the take-up roll collects solid debris such as seed husks which do not adhere to the plastic material. A second, simplified embodiment incorporates a knob to permit an operator to manually wind the plastic material on said take-up roll.

8 Claims, 2 Drawing Sheets

BIRD CAGE WITH CONVEYOR FOR DISPOSING OF DEBRIS

BACKGROUND OF THE INVENTION

This invention relates to cages for birds and other small animals, and more particularly to a cage incorporating a self cleaning feature.

It is well known that cleaning of bird cages is one of the least attractive features of owning birds. Not only is there the problem of disposing of body wastes, but the birds tend to drop and scatter seeds and seed husks over a significant area. If accessible to insects they Will be drawn to a dirty bird cage also. Thus, it is necessary to clean the floor of bird cages frequently which is never a pleasant task.

Applicant is aware of designs of bird cages which include structure for facilitating the manual cleaning of bird cages such as those shown in U.S. Pat. Nos. 3,815,549; 3,834,352; and 4,617,873. A self-cleaning cage for small animals is taught in U.S. Pat. No. 4,498,421 which includes a belt movable over rollers beneath a perforated bottom to catch wastes including a scraper for scraping wastes off the belt, a waste collector and a cleaning pan for collecting liquids, the device further including steam cleaning means for cleaning the belt. While such a cleaning system may be effective for certain types of caged small animals, it appears somewhat more elaborate and involved than required for bird cages.

BRIEF DESCRIPTION OF THE INVENTION

Applicant has devised a self-cleaning bird cage which is easily operated, which may be made automatic, and which conveniently assures a reasonable clean floor under the perch with a minimum of effort. This cage includes an upper chamber which is preferably of transparent plastic or glass for observing the bird or birds, or it may be a conventional wire cage. At the bottom of such chamber is a perforated floor which is preferably a coarse screen which permits waste and food debris to fall through to a web of thin plastic material such SARAN WRAP (polyethylene teraphthalate) which tends to adhere to itself and to many other materials. This web is fed from a roll stored on one side of a lower cabinet supporting the upper chamber over a roller, over a platform below the perforated floor, over another roller on the opposite side of the cabinet, and is then wound on a take-up roller which continually covers each layer of waste with the next layer. Alternatively, the screen may be eliminated and the floor will consist of the plastic web and its platform. A container located below the second roller and the take-up roller catches solid debris such as seeds and seed husks which do not adhere to the plastic web.

The take-up roller is driven by an electric motor which may be manually operated with the observer simply watching the movement of the web until only clean plastic material is under the floor or it may be connected to a timer which operates the motor for a sufficient interval to replace the plastic web under the floor. By connecting a twenty-four hour timer, the plastic web may be advanced two or three times a day or as found desirable. In a simpler embodiment, the plastic web may be advanced manually by an operator turning a knob on the take-up roller.

In the normal course, the take-up roller holds enough waste and debris such that it need only be replaced every two or three months. Since the plastic material tends to seal on itself, the waste adhering to the plastic is effectively enclosed so there is little or no odor from the take-up roll. The box below the takeup roll is readily observable and can easily be emptied whenever desired Since its contents are essentially all solids such as seed husks, it contributes negligible odor unless unemptied for an extended period.

BRIEF DESCRIPTION OF THE DRAWING

This invention may be more clearly understood from the following detailed description and by reference to the drawing in which.

DETAILED DESCRIPTION OF THE INVENTION

Figure 1:
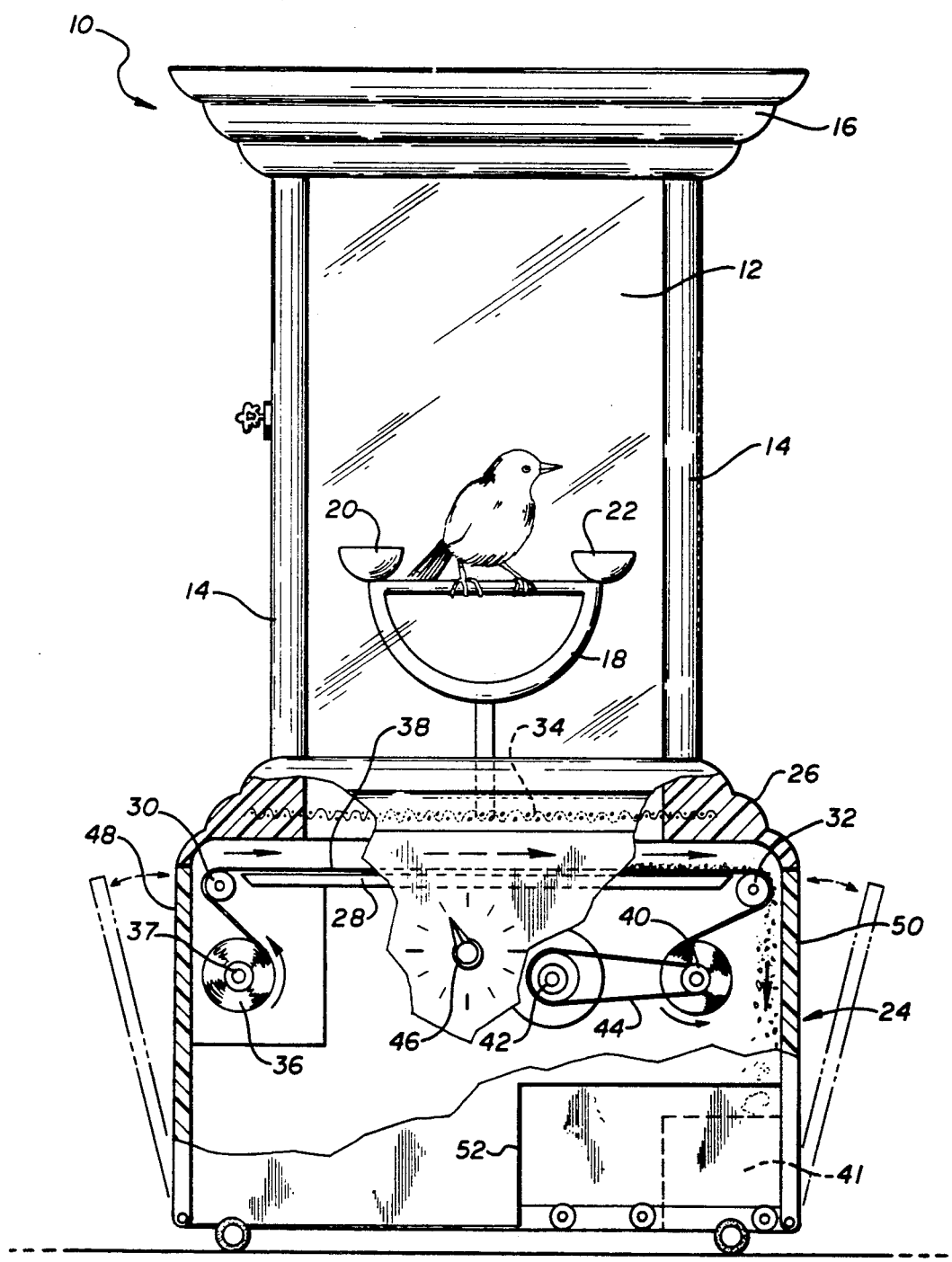
FIG. 1 is a front view of the bird cage of the invention as seen from the front with portions of the front panel removed.

Referring now to the FIG. 1, the cage portion consists of a chamber 10 including transparent panels 12 at the front, back and sides, with corner posts 14, and a decorative top 16. Within the chamber is a perch 18 including bird feeders 20, 22, the perch being secured to a back wall.

Supporting the chamber 10 is a base unit 24 which constitutes a closed cabinet (with part of the front panel removed for clarity) with an upper portion 26 which is similar to the configuration of top 16. Carried within base unit 24 is a platform 28 having rollers 30,32 at each end. Supported in upper portion 26 is a coarse screen 34 which effectively becomes the floor of the cage. At the left side of the base unit 24 is a roll 36 of a very thin (1 mil) plastic material (such as polyethylene teraphthalate) carried on a roller 37 which feeds as a web 38 across platform 28 below the perforated floor 34. As the web 38 moves across platform 28 it is redirected by roller 32 to wind onto the take-up roll 40 causing each layer of soiled plastic material to be covered by the next. With the angle of the web 38 leaving roller 32, any loose solid debris to be dropped into a box 41.

Take-up roll 40 is driven by an electric motor 42 through a belt 44. Motor 42 is energized through operation of a clock timer or switch 46. Switch 46 may be connected to, or integral with, a timer to operate the motor 42 for a time sufficient to replace the plastic web beneath floor 24 and at intervals as desired. Doors 48 and 50 provide access to rolls 36 and 40, respectively; door 48 being pivoted at the bottom to access roll 36 and door 50 being similarly pivoted at the bottom to provide access to take-up roll 40.

In operation, one would open door 48 to place a large roll of the plastic material 36 on roller 37, then feed the plastic web over roller 30, platform 38, roller 32 and attach it to take-up roll 40. When the bird or birds within chamber 12 have created an unsatisfactory level of debris, etc, on the plastic web 38, switch 46 is actuated to cause motor 42 to "reel in" the soiled plastic. At this time, loose seeds, etc., will fall from the plastic web 38 into box 41. Whether the switch 46 is operated manually or automatically, the web at the bottom of the chamber 12 will normally be wound on the take-up roll 40 from one to three times a day to clean the cage. Each layer of material on the roll will tend to seal to the last layer to a significant degree, thus trapping the debris between the layers and effectively preventing the generation of noxious odors, etc., which would otherwise make it necessary to physically remove such debris.

In the course of about three months, the plastic roll at 36 could be substantially wound onto take-up roll 40. At that time one may open door 50 removing the soiled plastic material at 40 and dispose of it. A new roll of plastic material is then installed on roller 37, the web fed over roller 30, platform 28 and roller 32 and attached to take-up roll 40. The box 41 may have to be emptied a number of times in this period which would be accomplished by sliding a door 52 to the left to gain access to box 41.

Figure 2:
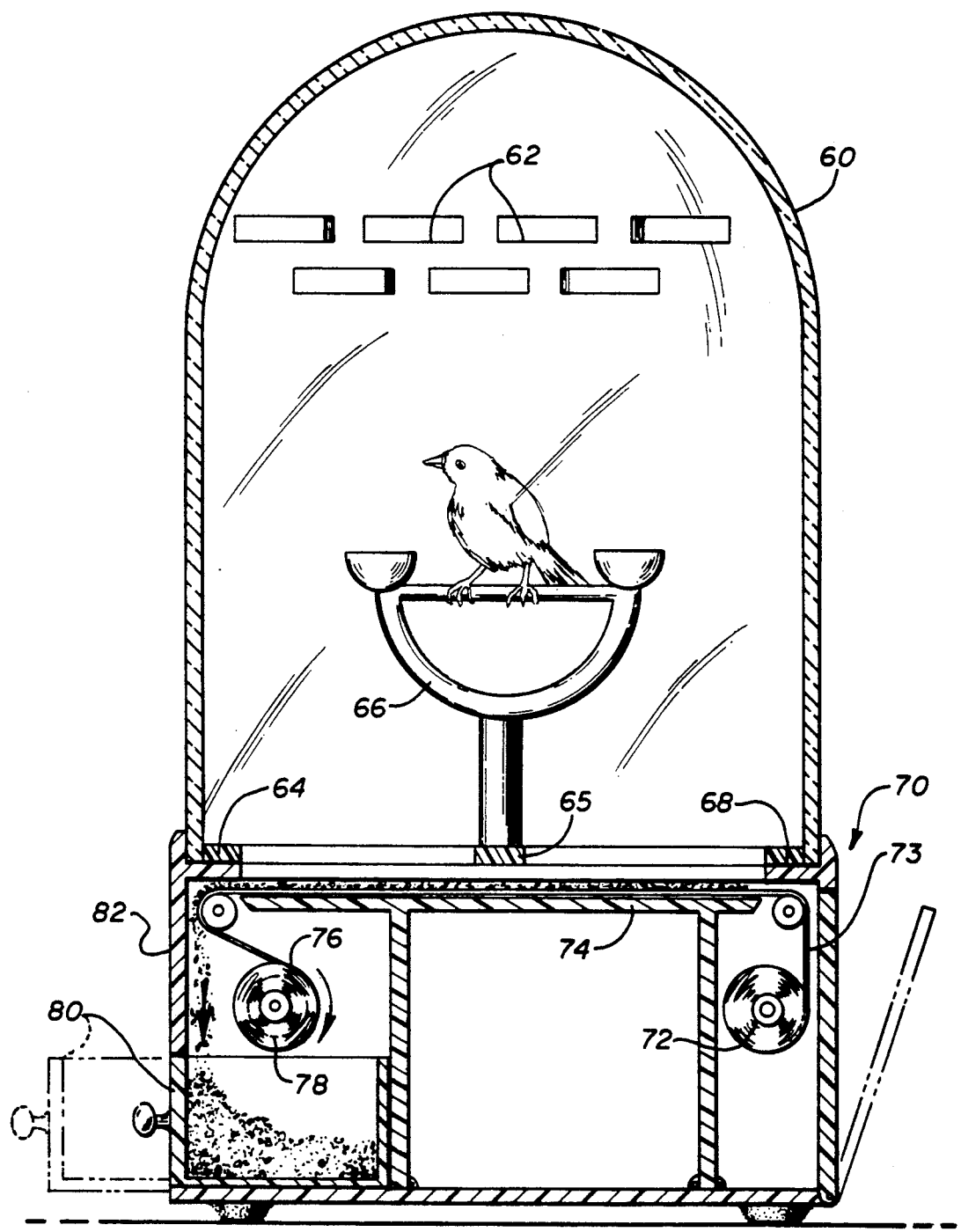
FIG. 2 is a front view partly in section of another embodiment of the invention.

A simplified embodiment is shown in FIG. 2. In this embodiment a rectangular cage portion 60 is provided with a plurality of air vents 62 near its top and includes a lower edge which is reinforced as shown at numeral 64 such that it can support a cross member 65 supporting a perch 66, which may be similar to perch 18. Cage 60 is supported on an inwardly extending ledge 68 of a lower base unit or housing member 70 which may be dimensioned to sit on a shelf, a table, or other suitable support to raise the bird or birds to eye level or other desired height. Housing 70 which is shown in section with the front panel removed, supports a roller 72 for carrying a roll of plastic web material such as that described above, but this housing and roller are conveniently dimensioned to carry a roll of the plastic material such as that found in any supermarket and in many other stores. Such a roll carries a smaller amount of material than that described above but is readily available in a large number of business places. This web of material 73 is fed over a platform 74 which may have edge rollers such as rollers 30 and 32 of FIG. 1. If such rollers are not used platform 74 should have edges and a top surface of material to which the plastic web will not adhere, such as a layer of polytetrafluoroethylene (TEFLON) or other suitable plastic material. The web 73 is then rolled onto a take-up roll 76 at the opposite end of platform 74. Take-up roll 76 is manually operated by a knob 78 external of housing member 70. The droppings from birds in the cage 60 will land on the surface web 73 where is passed across the platform 74 and any solid particles such as seed husks that do not adhere to the web are dropped into a drawer 80 positioned below the left end of the platform 74. Drawer 80 is readily removed to empty such husks or other solids. A portion 82 of housing member 70 above drawer 80 should preferably be removable to afford access to take up roll 76.

When the owner or operator observes that the floor of cage 60 as represented by the area of web 73 that is covering platform 74, is substantially fouled with droppings, etc., he or she may rotate knob 78, hence roll 76, sufficient to transfer the covered area of web 73 to the take up roll 76. This will trap the debris between layers of web 73, as explained above, which will render them essentially inoffensive. Solid materials not adhering to web 73 will drop into box 80.

Modifications will be apparent to those skilled in the art. Obviously, the cage must be rectangular for the web feed between the rollers to cover the necessary area. With a suitable rearrangement of parts and access means the web could feed front to back, back to front, right to left. Depending upon the installation, the number of transparent panels may vary from one to four. While a conventional cage with bars could be used in place of the transparent panels, it will be recognized that many birds will throw seeds and husks considerable distances and such debris could fall outside the cage and have to be picked up separately. The electric motor drive rather than using a belt could be gear driven or the motor could be built into roll 40.

The above described embodiments of the present invention are merely descriptive of its principles and are not to be considered limiting. The scope of the present invention instead shall be determined from the scope of the following claims including their equivalents.

What is claimed is:

1. A self-cleaning bird cage including an enclosed chamber including a plurality of walls of transparent, non-porous material, a perch in said chamber, and a coarse screen constituting a floor at the bottom of said chamber;

a base unit supporting said chamber including a cabinet, a roll of sheet plastic material in said cabinet and a take-up roll in said cabinet with said sheet plastic material being of a thickness of no more than about 1 mil and extending in a web across said chamber and below said floor from said roll to said take-up roll;

electric motor means connected to said take-up roll and switch means operative to energize said motor to roll said web onto said take-up roll; and a box located in said cabinet under said take-up roll for receiving solid debris falling from said web before it is wound on said take-up roll.

2. A bird cage as claimed in claim 1 wherein timing means is connected to said electric motor means to cause said electric motor means to be operated at desired intervals and for a desired period of time to cause the sheet plastic material above said platform to be transferred to said take-up roll and replaced with clean sheet plastic material.

3. A bird cage as claimed in claim 2 wherein said timing means includes a clock with means initiating said electric motor means at intervals.

4. A bird cage comprising a generally rectangular chamber having at least one non-porous wall of transparent material, and a perch in said chamber;

a housing supporting said chamber, a generally rectangular platform supported in said housing, and rollers carried on said platform at opposite sides thereof;

a roll of sheet plastic material in said housing of no more than about 1 mil thickness, said material being of a type which adheres to itself and to other materials, said material extending in a web across said platform for receiving debris from said chamber;

a take-up roll on the opposite side of said housing from said first named roll for receiving said sheet plastic material; and means connected to said take-up roll to roll said web onto said take-up roll; and a box located in said hosing under said take-up roll for receiving solid debris falling from said web before it is wound on said take-up roll.

5. A bird cage as claimed in claim 4 wherein the surface of said platform adjacent said web is formed of a material to which said web will not adhere.

6. A bird cage as claimed in claim 3 wherein said means connected to said take-up roll for rolling said web onto said take-up roll comprises electric motor means and switch means operative to energize said motor to roll said web onto said take-up roll.

7. A bird cage as claimed in claim 6 wherein timing means is connected to said electric motor means to cause said electric motor means to be operated for a desired period of time to cause the soiled plastic material above said platform to be transferred to said take-up roll and replaced with clean plastic material.

8. A bird cage comprising a chamber for holding a bird, a perch in said chamber, a perforated floor at the bottom of said chamber, a housing supporting said chamber, a roll of sheet material and a take-up roll in said housing, said sheet material extending in a web below said floor between said roll and said take-up roll, means connected to said take-up roll to roll said web onto said take-up roll, means in said housing for gaining access to said roll and said take-up roll, and receptacle means positioned below said take-up roll; characterized in that:

said chamber is formed of a plurality of walls of nonporous transparent material and a top carried above said walls;

said sheet material is of a plastic material no more than about 1 mil thick of a type which tends to adhere to itself and to other materials;

a rectangular platform is supported in said housing below said web such that said web is supported at least partially on said platform; and rollers are attached to opposite sides of said platform adjacent said roll and said take-up roll to minimize the forces on said web when said web is being wound on said take-up roll.

* * * * *